United States Patent [19]

Rehfuss et al.

[11] Patent Number: 5,719,237
[45] Date of Patent: Feb. 17, 1998

[54] COATING COMPOSITION UTILIZING NON-POLYMERIC CARBAMATE-FUNCTIONAL COMPOUND

[75] Inventors: John W. Rehfuss, West Bloomfield; Walter H. Ohrbom; Donald L. St. Aubin, both of Commerce Township; Robert J. Taylor, Northville, all of Mich.

[73] Assignee: BASF Corporation, Southfield, Mich.

[21] Appl. No.: 333,915

[22] Filed: Nov. 3, 1994

Related U.S. Application Data

[63] Continuation-in-part of Ser. No. 98,176, Jul. 28, 1993, Pat. No. 5,512,639.

[51] Int. Cl.$^6$ ..................................................... C08F 283/00
[52] U.S. Cl. .................. 525/419; 525/439; 525/452; 525/453; 525/456; 525/459; 525/461; 525/509; 528/44; 528/69; 528/85
[58] Field of Search .................... 525/509, 439, 525/419, 452, 461, 453, 456, 459; 528/44, 69, 85

[56] References Cited

U.S. PATENT DOCUMENTS

| | | | |
|---|---|---|---|
| 3,464,938 | 9/1969 | Nordstrom. | |
| 4,279,833 | 7/1981 | Culbertson et al. | 260/464 |
| 4,677,168 | 6/1987 | Hoy et al. | |
| 5,098,947 | 3/1992 | Metzger et al. | 524/507 |
| 5,134,205 | 7/1992 | Blank | 525/509 |
| 5,356,669 | 10/1994 | Rehfuss et al. | 427/407.1 |

FOREIGN PATENT DOCUMENTS

| | | | |
|---|---|---|---|
| WO 94/10211 | 5/1994 | European Pat. Off. | C08F 8/30 |
| WO 94/10212 | 5/1994 | European Pat. Off. | C08F 8/30 |
| WO 94/10213 | 5/1994 | European Pat. Off. | C08F 8/30 |

OTHER PUBLICATIONS

DE 39 33 890 A1 "Process for the preparation of modified polyesters and their use", Oct. 11, 1989.
DE 38 11 497 A1, "Coating Compositions", Apr. 6, 1988.
DE 39 s9 697 A1, "Coating Compositions", Sep. 7, 1989, 3634780 a Description.

*Primary Examiner*—E. Rollins Buffalow
*Attorney, Agent, or Firm*—Paul L. Marshall

[57] ABSTRACT

Coatings are described derived from a curable coating composition comprising:
 (a) a non-polymeric organic compound having a molecular weight of from 75 to 2000 comprising a plurality of carbamate active hydrogens, and
 (b) a second component comprising a compound having a plurality of functional groups that are reactive with said carbamate active hydrogens.

16 Claims, No Drawings

COATING COMPOSITION UTILIZING NON-POLYMERIC CARBAMATE-FUNCTIONAL COMPOUND

This application is a continuation-in-part of U.S. patent application Ser. No. 08/098,176, filed Jul. 28, 1993 now U.S. Pat. No. 5,512,639.

FIELD OF THE INVENTION

This invention relates to coating compositions, especially compositions for high-gloss topcoats or the clearcoat of color-plus-clear composite coatings.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings such as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings. In addition, it is desirable to provide coatings with a good combination of properties such as durability, hardness, flexibility, and resistance to scratching, marring, solvents, and acids.

SUMMARY OF THE INVENTION

It has now been discovered that non-polymeric carbamate-functional compounds having a molecular weight of from 75 to 2000 can be used in coating compositions to provide coatings with good durability and resistance to attack. These coatings are particularly useful as the clearcoat of a color-plus-clear composite coating or in a high-gloss coating to provide good etch resistance. Thus, according to the present invention, there is provided a coating composition comprising:

(a) a non-polymeric organic compound having a molecular weight of from 75 to 2000 comprising a plurality of carbamate active hydrogens, and (b) a second component comprising a compound having a plurality of functional groups that are reactive with said carbamate active hydrogens.

The coating, when cured, provides a hard but flexible, durable, attractive finish that is highly resistant to environmental etch. The clearcoat composition can be effectively applied as a one-pack system without the necessity of mixing reactive materials just prior to application as in a two-pack system.

DESCRIPTION OF THE PREFERRED EMBODIMENTS

The compounds useful as component (a) according to the invention can be prepared in a variety of ways. Simple commercially-available carbamate or urea compounds such as methyl carbamate or butyl carbamate may be used in the present invention as component (a). It may often be desirable to avoid the inclusion of hydroxyl groups in such compounds, as they may lead to the formation of vulnerable ether bridges during cure. The compounds useful as component (a) comprise a plurality of carbamate active hydrogens. This can be accomplished with a single primary ($-O-CO-NH_2$) carbamate group, but is more preferably accomplished with a plurality of carbamate groups, and even more preferably a plurality of primary carbamate groups.

One way to prepare compounds useful as component (a) is to react an alcohol ('alcohol' is defined herein as having one or more OH groups) with a urea to form a compound with carbamate group(s). This reaction is accomplished by heating a mixture of the alcohol and urea. Another technique is the reaction of a polyol with a monoisocyanate (e.g., methyl isocyanate) to form a compound with multiple secondary carbamate groups or to react an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of a polyol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol or hydroxyalkyl carbamate is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful as component (c) according to the invention. They generally have from 1 to 160 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-metyl-2,4-pentanediol, 2,2,4-trimethyl-1,3- pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Another approach is to react an isocyanate (preferably a diisocyanate, e.g., HDI, IPDI) with a compound such as hydroxypropyl carbamate to form a carbamate-capped polyisocyanate derivative as described in U.S. patent application Ser. No. 08/098,176. The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and paraxylylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers α,α,α',α'-tetramethyl xylylene diisocyanate can be used. Biurets of isocyanates such as DESMODUR® N100 from Mobay may also be useful.

In one embodiment of the invention, the polyisocyanate (A)(1) is reacted with a compound containing an isocyanate-reactive group and a carbamate group, e.g., a hydroxyalkyl carbamate such as hydroxypropyl carbamate or hydroxyethyl carbamate. Alternatively, the polyisocyanate may be adducted with substituents that have the capability of forming carbamate groups after reaction with the polyisocyanate compound is completed. For example, the polyisocyanate can be reacted with a compound having an active hydrogen group (e.g., hydroxyl) and a cyclic carbonate group (e.g., the reaction product of glycidol and $CO_2$), and the cyclic carbonate groups then reacted with ammonia to form the carbamate functional groups. Alternatively, the polyisocyanate can be reacted with an active hydrogen group (e.g., hydroxyl) and an epoxy group, and then with $CO_2$ to convert the epoxy to cyclic carbonate, and the cyclic carbonate groups then reacted with ammonia to form the carbamate functional groups.

Another method of synthesis is to first react the isocyanate groups on the polyisocyanate with a compound having a group that is reactive with isocyanate and also a non-NCO functional group. This adduct is then reacted with a compound comprising at least one carbamate group or group that can be converted to carbamate and at least one group reactive with the non-NCO functional groups. Examples of non-NCO functional groups include carboxyl, epoxy, hydroxyl, amino. For example, an OH-functional polyisocyanate (which can be formed by reacting a polyisocyanate with an amino alcohol) can be reacted with the oxygen of a COO portion of the carbamate group on an alkyl carbamate or with the methylol group of methylol acrylamide (HO—CH₂—NH—CO—CH=CH₂). In the case of the COO group on an alkyl carbamate, the hydroxyl group on the polyurethane undergoes a transesterification with the COO group, resulting in the carbamate group being appended to the polyurethane. In the case of methylol acrylamide, the unsaturated double bond is then reacted with peroxide, $CO_2$, and ammonia as described above. The epoxy groups are then reacted with $CO_2$ to form cyclic carbonate groups, which are converted to carbamate groups by reaction with ammonia. Alternatively, an acid-functional polyisocyanate (which can be formed by reaction of a polyisocyanate with a hydroxy-functional carboxylic acid) can be reacted with acetic anhydride to generate an anhydride-functional triisocyanurate, which can then be reacted with an hydroxycarbamate.

The above-described polyisocyanates are adducted with compounds containing a carbamate group or group that can be converted to carbamate and a group that is reactive with the NCO- or non-NCO-functional group on the polyisocyanate. Carbamate-containing compounds that can be adducted onto the NCO groups of a diisocyanate or an isocyanurate are preferably active hydrogen-containing carbamates such as hydroxyalkyl carbamates (e.g., hydroxypropyl carbamate or hydroxyethyl carbamate). Compounds containing groups that can be converted to carbamate and groups that are reactive with NCO include active hydrogen-containing cyclic carbonate compounds convertible to carbamate by reaction with ammonia (e.g., the reaction product of glycidol and $CO_2$), monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

The compound (a) will generally have a molecular weight of 75–2000, and preferably from 75–1500. As used herein, molecular weight means number average molecular weight. Molecular weight can be determined by the GPC method. The glass transition temperature, $T_g$, of components (a) and (b) can be adjusted to achieve a cured coating having the $T_g$ for the particular application involved. The compound (a) is preferably used at levels between 3 to 50 percent (based on total resin solids of the coating composition), and more preferably between 30 to 50 percent.

The carbamate groups on compound (a) can be represented by the formula:

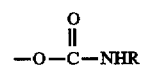

wherein R is H or alkyl of 1 to 4 carbon atoms. Preferably, R is H or methyl, and more preferably R is H.

The composition of the invention is cured by a reaction of the carbamate-functional compound (a) with a component (b) that is a compound having a plurality of functional groups that are reactive with the carbamate groups on component (a). Such reactive groups include active methylol or methylalkoxy groups on aminoplast crosslinking agents or on other compounds such as phenol/formaldehyde adducts, siloxane groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. Pat. No. 5,300,328.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional compound (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with mall amounts of aqueous co-solvents.

The coating composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers Wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds (c) according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples.

Preparation 1

A reactor was charged with 363 parts propylene glycol monomethyl ether acetate and 25.9 parts of toluene, and heated under inert atmosphere to reflux (140° to 143° C.). Once at reflux, the inert atmosphere was turned off and 26.6 parts of the refluxed reaction mixture was removed. The mixture was then cooled to 80° C. and 707 parts of T-1890® (the isocyanurate of isophorone diisocyanate, available from Hüls), 198.4 parts of isophorone diisocyanate, and 4.3 parts of dibutyltin dilaurate was charged. 458.9 parts of hydroxypropyl carbamate was then added over two hours and 35 minutes. 110.7 parts of of propylene glycol monomethyl ether acetate was then charged. The system was kept at 80°

C. until the reaction mixture was free of isocyanate. 323.7 parts of xylene and 96.7 parts of n-butanol were then added. The resulting product had a solids content of 53.9%, and a theoretical non-volatile carbamate equivalent weight of 300 g/eq.

13.1 g of this product was combined with 3.3 g of a melamine formaldehyde resin having 50% of the functional groups blocked with butyl carbamate, and 0.06 g dodecyl benzene sulfonic acid to form an 84.5% nonvolatiles composition. The system was reduced to 50% nonvolatiles with propylene glycol monomethyl ether acetate, and drawn down 8 mmon a glass substrate. The composition was then cured at 141° C. for 30 minutes to form a hard, clear, smooth colorless film that passed 200 methyl ethyl ketone double rubs.

Example 2

A reactor was charged with 360.7 parts propylene glycol monomethyl ether acetate and 25 parts of toluene, and heated under inert atmosphere to reflux (140° to 143° C.). Once at reflux, the inert atmosphere was turned off and 24 parts of the refluxed reaction mixture was removed. The mixture was then cooled to 78° C. and 539.5 parts of the isocyanurate of methylene bis(4-cyclohexylisocyanate), 215.8 parts of methylene bis(4-cyclohexylisocyanate), 4.3 parts of dibutyltin dilaurate and 323.7 parts of xylene was charged. 399.9 parts of hydroxypropyl carbamate was then added over 1 hour and 20 minutes. 100.8 parts of propylene glycol monomethyl ether acetate was then charged, and the reaction mixture was kept at 75° to 80° C. until free of isocyanate. 106.1 parts of Solvesso® S-100 mixed aromatic solvent, 106.0 parts of butyl acetate, and 160.3 parts of n-butanol were charged. The resulting product had a solids content of 51.1%, and a theoretical non-volatile carbamate eqilalent weight of 345.3 g/eq.

The invention has been described in detail with reference to preferred embodiments thereof. It should be understood, however, that variations and modifications can be made within the spirit and scope of the invention.

What is claimed is:

1. A curable coating composition comprising:
   (a) a non-polymeric organic compound having a molecular weight of from 75 to 2000 comprising a plurality of carbamate functional groups of the formula

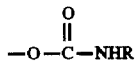

wherein R is H or alkyl of 1 to 4 carbon atoms, and
   (b) a second component comprising a compound having a plurality of functional groups that are reactive with said carbamate groups.

2. A coating composition according to claim 1 wherein said compound (a) is the reaction product of a polyisocyanate and a hydroxyalkyl carbamate.

3. A coating composition according to claim 1 wherein said compound (a) is the reaction product of a polyol and a monoisocyanate.

4. A coating composition according to claim 1 wherein said compound (a) is the reaction product of a polyol and an alkyl carbamate.

5. A coating composition according to claim 1 wherein said compound (a) is the reaction product of ammonia or a primary amine with the reaction product of a polyol and phosgene.

6. A coating composition according to claim 1 wherein said compound (a) is the reaction product of a polyol and urea.

7. A coating composition according to claim 1 wherein said compound (a) has a molecular weight of 75 to 1500.

8. A coating composition according to claim 1 wherein component (b) is selected from the group consisting of aminoplast resin, polysiloxanes, polyanhydrides, and compounds having a plurality of active methylol functional groups.

9. A coating composition according to claim 1 wherein component (b) is an aminoplast resin.

10. A coating composition according to claim 9 wherein said aminoplast resin is melamine formaldehyde resin.

11. A coating composition according to claim 10 wherein said melamine formaldehyde resin is fully or partially alkylated.

12. A coating on a substrate derived from a curable coating composition comprising:
   (a) a non-polymeric organic compound having a molecular weight of from 75 to 2000 comprising a plurality of carbamate functional groups, and
   (b) a second component comprising a compound having a plurality of functional groups that are reactive with said carbamate group.

13. A coating according to claim 12 having a 20° gloss, as defined by ASTM D523-89, of at least 80.

14. A coating according to claim 12 having a DOI, as defined by ASTM E430-91, of at least 80.

15. A coating according to claim 12 wherein said coating is the clearcoat of a color-plus-clear composite coating.

16. A coating on a substrate derived from a curable coating composition comprising:
   (a) a non-polymeric organic compound having a molecular weight of from 75 to 2000 comprising a plurality of carbamate functional groups of the formula

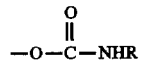

wherein R is H or alkyl of 1 to 4 carbon atoms, and
   (b) a second component comprising a compound having a plurality of functional groups that are reactive with said carbamate groups.

* * * * *